Oct. 9, 1951 C. W. EARP ET AL 2,570,221

PULSE CODE MODULATION SYSTEM

Filed Feb. 10, 1949 3 Sheets-Sheet 1

INVENTORS
CHARLES WILLIAM EARP
MALCOLM FRANK WINTLE
BY [signature]
ATTORNEY

INVENTORS
CHARLES WILLIAM EARP
MALCOLM FRANK WINTLE
BY R. P. Morris
ATTORNEY

PULSE CODE MODULATION SYSTEM

Filed Feb. 10, 1949 3 Sheets-Sheet 3

INVENTORS
CHARLES WILLIAM EARP
MALCOLM FRANK WINTLE
BY [signature]
ATTORNEY

Patented Oct. 9, 1951

2,570,221

UNITED STATES PATENT OFFICE 2,570,221

PULSE CODE MODULATION SYSTEM

Charles William Earp and Malcolm Frank Wintle, London, England, assignors to International Standard Electric Corporation, New York, N. Y., a corporation of Delaware Application February 10, 1949, Serial No. 75,534
In Great Britain February 20, 1948

11 Claims. (Cl. 332—11)

The present invention relates to electric pulse code modulation systems of communication, of the kind described in Reeves U. S. Patent Specification No. 2,272,070.

The invention relates to a pulse code modulation system in which a binary code is used for expressing the signal amplitudes. In this system, the signal amplitude at each of a sufficient number of instants is determined according to a scale having a finite number of steps, and the nearest scale value is expressed by a code in which at each of a specified number of instants in each code group, a pulse may be present or absent. If there are $m$ such instants, then the number of scale values which can be expressed is $2^m$.

The amplitude scale can be expressed by this code in a number of different ways and in one commonly used form of the binary code, the step number of the amplitude scale is given by $a_r 2^r$ where $r$ has all integral values from 1 to $m-1$ and zero, and $a_r$ is 1 or zero according as a pulse is present or absent in the corresponding code interval. This type of binary code is called for convenience the "simple addition" binary code. Another type of binary code known as the "staggered step binary code" is described in the specification of our co-pending U. S. application No. 75,532 dated Feb. 10, 1949 for Electric Pulse Code Modulation Systems of Communication. When $m=5$, a five unit code results, which is capable of expressing 32 different amplitude steps.

The principal object of the present invention is to provide a simple and convenient arrangement for coding or decoding signal waves according to the simple addition binary code.

Attention may be drawn to the specifications of our co-pending U. S. application No. 75,533 dated Feb. 10, 1949 for Electric Pulse Code Modulation Systems of Communication which cover two other different arrangements for coding the signal amplitude according to the simple addition code.

The present invention provides an electric pulse code modulation system of communication employing a simple addition binary code, in which the translation in either direction between the signal wave and the corresponding code groups of pulses is effected by means of a series of two condition trigger circuits corresponding respectively to the several elements of the code, which circuits are adapted to be respectively set in the first or second condition in accordance with the code distribution representing the instantaneous signal amplitudes.

Figure 1:
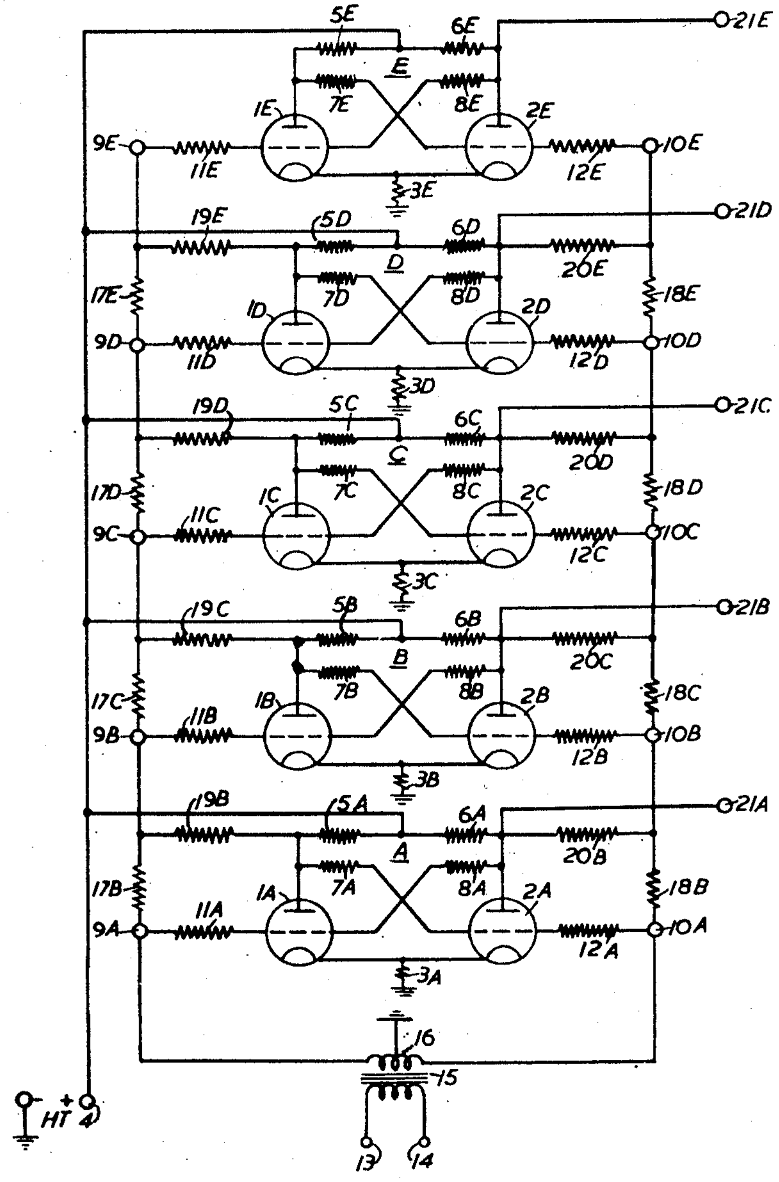
Figures 2, 3:
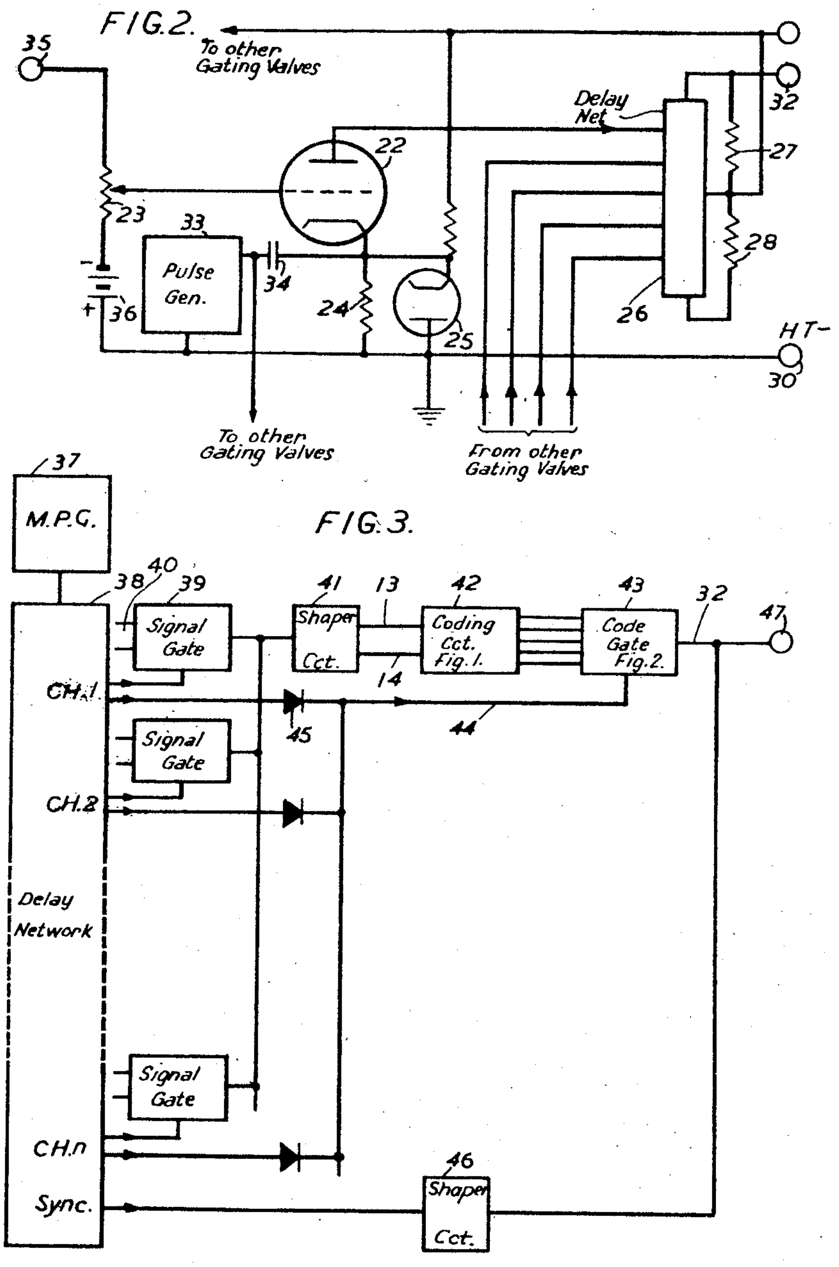
Figure 4:
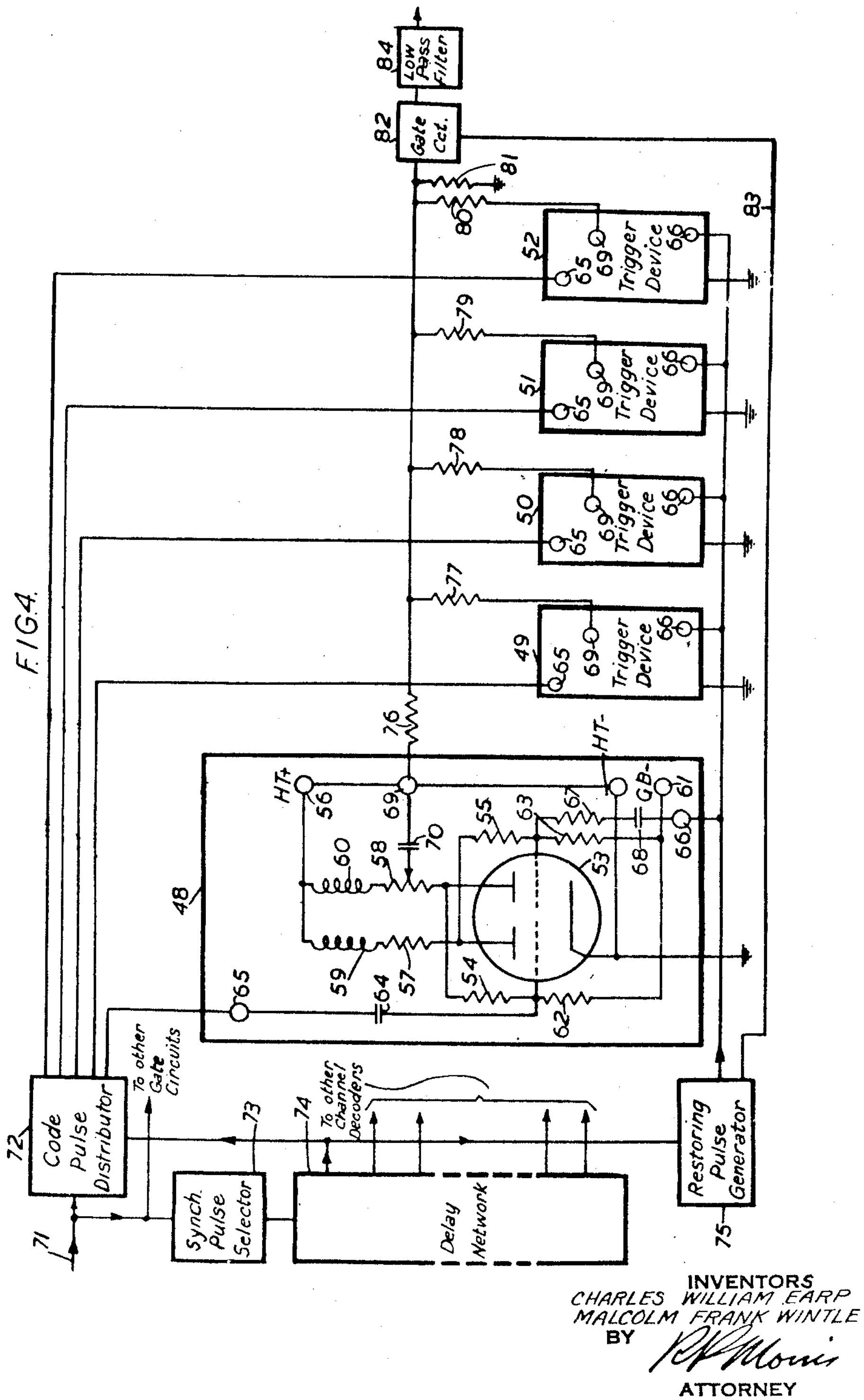

The invention will be described with reference to the accompanying drawings in which:

Fig. 1 shows a schematic circuit diagram of a pulse code modulator according to the present invention, Fig. 2 shows a schematic circuit diagram of the code gating arrangement employed for the circuit of Fig. 1, Fig. 3 shows a block schematic circuit diagram of a multi channel transmitter employing pulse code modulators according to the invention and Fig. 4 shows a block schematic circuit diagram of a receiver for pulses coded according to the simple addition binary code.

The arrangement shown in Fig. 1 is designed to produce code groups of pulses for a five unit simple addition binary code, but it may be extended by adding further identically arranged stages to deal with a code of any number of units. The first coding stage comprises two triode valves 1A and 2A arranged as a two-condition trigger device of multivibrator (Eccles-Jorden trigger circuit) of well known type, adapted to be stable in both conditions. The cathodes are connected to ground through a common bias resistance 3A and the anodes are connected to a positive terminal 4 for the high tension source (not shown) through equal resistances 5A and 6A.

The anodes are also connected to the opposite control grids through equal resistances 7A and 8A, these control grids being connected to two terminals 9A and 10A through equal resistances 11A and 12A.

The signal wave is applied at terminals 13 and 14 through a transformer 15 the secondary winding 16 of which has a centre tap which may be connected to the ground, the outside terminals being connected to terminals 9A and 10A.

The multivibrator comprising the valves 1A and 2A will take up a condition in which one of the valves is cut off, and the other is conducting. The bias should be such that if the valve 1A is cut off, the multivibrator will switch over to the other condition with the valve 2A cut off when the potential of the terminal 9A with respect to terminal 10 changes sign from negative to positive. The multivibrator should switch back again when this potential changes sign from positive to negative.

The remaining four coding stages are identical, and corresponding elements are given the same designation numbers distinguished by the letters B, C, D and E.

Terminals 9B and 10B are connected respectively to terminals 9A and 10A through equal resistances 17B and 18B, and to the anodes of valves 1A and 2A through equal resistances 19B and 20B. Each succeeding coding stage is connected to the preceding one in a like manner.

The anodes of the valves 2A to 2E are respectively connected to corresponding output terminals 21A to 21E.

It will be assumed that the range of the signal amplitude has been adjusted so that it covers sixteen positive and sixteen negative steps of the scale. Assume that the A multivibrator is in the condition such that the valve 1A is cut off. The resistances of the circuit are so adjusted that the A multivibrator applies to terminals 9B and 10B a difference of potential equivalent to 8 steps, terminal 9B being positive relative to terminal 10B.

If the multivibrator A were in the other condition this potential would be reversed. The B, C and D multivibrators are likewise adjusted so that positive or negative potential difference corresponding to 4, 2 and 1 steps respectively are applied to the succeeding multivibrators C, D and E. Since all the multivibrator circuits are symmetrical, the output potential difference will be reversed when any one of them is switched over.

Suppose that a signal potential of S steps is applied between terminals 9A and 10A, with 9A being positive.

If the multivibrator A is in the first condition (with valve 1A cut off), it will evidently be switched over to the second condition (with valve 2A cut off). It will be noted that the signal potential +S steps and the multivibrator output potential (−8 steps) are applied respectively through resistances 17B, 18B, and 19B, 20B, between terminals 9B and 10B. If S is greater than 8, the multivibrator B will be switched over to the second condition. Suppose therefore that S is greater than 8. It will be clear that a potential of $S-8-4$ steps will be applied between terminals 9C and 10C. If $S-8-4$ is negative, for example, the C multivibrator will remain in the first condition and the potential applied between terminals 9D and 10D will then be $S-8-4+2$. If this is again negative, for example, then the D multivibrator will be in the first condition and will apply a potential $S-8-4+2+1$ between terminals 9E and 10E and if this is positive, for example, the last multivibrator will be changed over to the second condition. Thus multivibrators A, B and E will be left in the second condition and C and D in the first condition, and a corresponding distribution of potentials will appear at the output terminals 21A and 21E.

It will be noted that the coupling resistances 17, 18, 19 and 20 will introduce a progressively increasing attenuation to the combined potential applied to successive multivibrators, so the actual output voltage corresponding to the 8, 4, 2 and 1 steps will need to be adjusted to take account of this attenuation. This is expressed by the statement that the voltage applied to multivibrators B, C, D and E are respectively $k_2(S\pm8)$
$k_3(S\pm8\pm4)$
$k_4(S\pm8\pm4\pm2)$, and
$k_5(S\pm8\pm4\pm2\pm1)$ where $k_2$ to $k_5$ are of progressively decreasing magnitudes, and all are less than 1.

To make the matter clearer, suppose S corresponds to +12.5 steps. Then multivibrator A is in 2nd condition; $S-8$ is positive so Multivibrator B is in 2nd condition;
$S-8-4$ is positive so,
Multivibrator C is in 2nd condition;
$S-8-4-2$ is negative so,
Multivibrator D is in 1st condition;
$S-8-4-2+1$ is negative, so,
Multivibrator E is in 1st condition.

If S had the opposite sign then it is clear the multivibrators A, B and C would be in the 1st condition and D and E in the 2nd condition.

When any multivibrator is in the 2nd condition a relatively high potential appears on the corresponding output terminal 21. As will be explained later on, this potential may be used as a gating potential to control the emission of a corresponding code pulse.

It will be clear that the distribution of potentials on terminals 21 will represent the signal amplitude in accordance with the simple addition binary code. As the signal amplitude varies, so the distribution will change accordingly every time the signal amplitude passes through the value separating two steps of the amplitude scale.

Although Fig. 1 shows the signal applied, with equal and opposite potentials with respect to ground to terminals 9A and 10A, it may not be convenient to obtain the signal in this form, and it may not be practicable to employ a transformer such as 15 with a centre tapped secondary winding. In such a case the transformer may be omitted, and the terminal 10A may be connected directly to ground, and terminal 9A may be connected to ground through suitable resistance (not shown). The signal potential is then applied directly to terminal 9A.

The arrangement of Fig. 1 is adaptable for producing code groups according to a simple addition binary code of $m$ units, by providing $m$ similarly arranged trigger circuits. The output voltages of the first $m-1$ of these trigger circuits will be adjusted to be proportional to $2^{(m-r-1)}$, where $r$ takes all integral values from 1 to $m-1$.

Fig. 2 shows one way in which the code pulses may be obtained from the distribution of potentials on the output terminals 21A to 21E of Fig. 1. Five similarly arranged gating valves are used; only one of these valves is shown at 22. The control grid is connected to the movable contact of a high resistance potentiometer 23.

The cathode of the valve 22 is connected to ground through a resistance 24 shunted by a diode or other suitable rectifier 25. The anode is connected to a suitable tapping on a delay network 26. This network is terminated at both ends by respective resistances 27 and 28. The high tension source (not shown) will be connected to terminals 29 and 30, and terminal 29 is connected to the common point of resistance 27 and 28 and through the delay network 26 to the anode of the valve 22. The cathode of the valve is also connected to terminal 29 through a resistance 31. The values of the resistances 24 and 31 are chosen so that the valve is biassed beyond the cut off point. An output terminal 32 is connected to one end of the delay network.

A pulse generator 33 supplies negative pulses through a blocking condenser 34 to the cathode of the valve 22. The repetition frequency of these pulses should at least be two or three times the maximum frequency of the band occupied by the signal, for example, for speech signals, the repetition frequency of these pulses may be 10,000 pulses per second. The duration of the pulses should be very short, for example, one microsecond.

The potentiometer 23 is connected at one end to an input terminal 35 and at the other end through a negative bias source 36 to ground. The input terminal 35 will be connected to one of the output terminals such as 21A of Fig. 1. The corresponding input terminals of the other four gating valves (not shown) will be connected respectively to the output terminals 21B to 21E of Fig. 1.

It has already been explained that when the multivibrator A is in the first condition, the anode potential of the valve 2A is low, while when it is in the second condition this potential is high. The potentiometer 23 of Fig. 2 should preferably be adjusted so that in the second condition of the multivibrator the potential applied to the control grid of the gating valve is about zero. This valve should be so biassed that in this condition, a pulse from the generator 33 is able to unblock the valve, so producing an output code pulse, which is supplied to the delay network 26 and thence to the output terminal 32.

When the multivibrator A is in the first condition, the grid potential will then be negative, and the pulse from the generator cannot unblock the valve, so no code pulse is produced.

The diode 25 is provided to prevent the potential of the cathode from being driven negative by the pulses from the generator 33 and in this way a load on the output of the multivibrator due to grid current will be prevented. This diode is however optional and could be omitted.

The other four gating valves (not shown) will be arranged in the same way, and may all be supplied to different tappings on the delay network 26 (which is common to all the valves) as indicated, so that the pulses corresponding to the five code elements when present, are delivered to terminal 32 in sequence, the intervals between such pulses being determined by the delay network.

It will be understood that these pulses may be transmitted in any order, not necessarily in the same order as the multivibrators are arranged in Fig. 1.

So far it has been assumed that only one signal channel has to be considered. The arrangements described may however be adapted to coding all the signal channels of a multichannel communication system. The manner in which this may be done is indicated by the block schematic circuit diagram shown in Fig. 3. The arrangement is applicable to any number of channels, although the apparatus for only three of these channels is shown, namely the first two and the last. The apparatus for all channels is identical, and only that for channel 1 will be described. In Fig. 3 a master pulse generator 37 supplies very short pulses to a delay network or other suitable distributor 38. The repetition frequency of these pulses should be equal to the repetition frequency desired for the code groups of each individual channel, for example 10,000 pulses per second.

The apparatus for channel 1 comprises a signal gating circuit 39 of conventional type consisting for example of a blocked amplifier to which the signal wave is applied at terminals 40, and to which are applied unblocking pulses from the first tapping on the delay network. Very short samples of the signal amplitude are thus periodically obtained in the form of amplitude modulated pulses.

Similar gating circuits connected to corresponding later tappings for the remaining channels are provided. Only two of these gating circuits are shown, for channel 2, and the last channel $n$. The pulses from all the gating circuits which occur at different times, are combined and are preferably passed through a suitable shaping circuit 41 adapted to lengthen the pulses slightly. The lengthened pulses are then applied to terminals 13 and 14 of a coding circuit 42 as described with reference to Fig. 1. This is connected over five conductors to the code gate circuit 43 as described with reference to Fig. 2.

The circuit 43 is controlled by control pulses derived over conductor 44 from slightly later tappings of the network 38, corresponding respectively to the signal gate circuits. These control pulses are combined through rectifiers 45 provided to prevent pulses from being fed back to the delay network 38.

The control pulses may be used to synchronise the generator 33 (Fig. 2), or may be used directly as gating pulses, the generator 33 being omitted.

The signal pulses derived from the shaping circuit 41 should be sufficiently long to ensure that the five multivibrators shown on Fig. 1 have time to set themselves before the pulse disappears. Each gating pulse which operates the code circuit 43 should be very short, and should occur after the multivibrators have set themselves but before the disappearance of the corresponding signal pulse. This will avoid any risk of a false code being sent out before the multivibrators are completely set.

The shaping circuit 41 may take the form of a low pass filter so designed as to lengthen the pulses sufficiently, or it may take any other form. The filter will tend to round the crests of the pulses and this rounding should not be sufficient to produce an amplitude variation which approaches one top of the amplitude scale before the code pulses are sent out.

A train of synchronising pulses may be derived from a suitable tapping of the network. These pulses may be given some distinguishing characteristic by a shaping network 46. The code pulses from the output terminal 32 of the code gate circuit 43 and the shaped synchronising pulses from the circuit 46 combined and applied to an output terminal 47 which is connected to the outgoing line, or other communication medium.

It will be understood that as is usually desirable in pulse code modulation system, the signal wave may be subjected to a logarithmic amplitude compression before application to terminals 13 and 14 of Fig. 1, or to terminals 40 of the signal gates in Fig. 3.

Fig. 4 shows an arrangement for decoding the pulse code groups of the simple addition binary code. The principal elements comprise five similar two-condition trigger devices or multivibrators 48, 49, 50, 51 and 52. These are of substantially the same type as those shown in Fig. 1, and are stable in both conditions. Circuit details of No. 48 only are shown, the other being the same. It comprises a double triode valve 53 with the common cathode connected to ground. The anodes are cross connected to the opposite control grids by resistances 54 and 55, and are connected to the positive high tension terminal 56 through load resistances 57 and 58, and through high frequency choke coils 59 and 60. The control grids are connected to a negative bias terminal 61 through resistances 62 and 63. The left hand control grid is also connected through a blocking condenser 64 to a triggering terminal 65, and the right hand control grid is connected to a restoring terminal 66 through a resistance 67 and a blocking condenser 68. An output terminal 69 is connected through a blocking condenser 70 to an adjustable contact on the resistance 58.

It will be assumed that in the normal or first condition of the trigger device, the left hand half of the double triode 53 is cut off. It will be clear that if a positive pulse of sufficient amplitude is applied to terminal 65 the device will be switched over to the second condition in which the right hand half of the valve 63 is cut off. Furthermore a positive pulse applied to terminal 66 will restore the circuit to the first condition.

It will be assumed that the pulse code groups corresponding to a plurality of signal channels will be received, accompanied by a train of synchronising pulses, produced, for example, by the arrangement of Fig. 3. The pulses are received from the radio receiver or other communication medium over conductor 71. This conductor is connected in parallel to a series of conventional code pulse distributor devices corresponding respectively to the channels of the system one of these being shown at 72. The conductor 71 is also connected to a synchronising pulse selector 73 connected to a delay network 74, the elements 73 and 74 being common to all the channels. The device 72 is supplied with control pulses from a tapping on the delay network 74 corresponding to the channel to be selected. The distributing devices (not shown) corresponding to the other channels are connected to other tappings on the delay network as indicated, in the well known way. The device 72 is adapted to pick out the groups of code pulses of the corresponding channel, and to deliver the pulses of each group separately to five output conductors corresponding respectively to the five code elements. The device 72 thus acts as a code element separator and operates as a distributor on conventional lines so that it is unnecessary to describe it in greater detail.

The pulses of the five code elements are applied in positive sense respectively to terminals 65 of the five trigger circuits, as indicated, these circuits being all in the normal or first condition.

It will be clear that if a pulse corresponding to any code element is present, it will change over the corresponding trigger circuit to the second condition.

The control pulses supplied from the tapping of the delay network 74 to the distributor circuit 72 are also applied to synchronise a restoring pulse generator 75, which supplies positive restoring pulses to the terminal 66 of each of the trigger circuits. This generator should be timed so that a restoring pulse is produced shortly after the corresponding code group has completed setting all the trigger circuits, and restores them all to the first condition.

The output terminal 69 of the trigger circuits are connected to a mixing network comprising five corresponding relatively high equal resistances 76, 77, 78, 79 and 80 connected in common to a relatively small shunt resistance 81, the potential across which will be substantially equal to the sum of the output potentials of the five trigger circuits. Any other suitable mixing device, possibly including valves, may be used instead.

The potential across the resistance 81 is applied to a conventional gate circuit 82 which is normally blocked, but which is opened for a brief period just after the trigger circuits have been set by the code group but before the restoration by the restoring pulse from generator 75. The gate circuit 82 may be opened by a suitably timed pulse obtained from the generator over conductor 83. It will be evident that a train of amplitude modulated pulses will be obtained from the gate circuit 82 and the signal may be recovered from these pulses by means of a low pass filter 84 and may be applied to any type of utilisation device (not shown).

It has already been explained that the circuit of the five trigger devices are all similar. However, they will differ in the adjustment of the tap on the resistance 58. This adjustment should in each case be such that the change in potential obtained at the terminal 69 when the circuit is changed from the first to the second condition is proportional to the numbers 16, 8, 4, 2, 1, respectively for the trigger devices 48, 49, 50, 51 and 52. The voltage across the mixing resistance 81 will then be proportional to the sum of the voltages corresponding to those trigger devices which are changed to the second condition by the pulses of the code group and will therefore correspond exactly to the signal voltage which originally set the trigger devices in Fig. 1 in accordance with the simple addition binary code.

It has been said that the code pulses may be transmitted in any order. It will of course be necessary to arrange the distribution of the code pulses on the output conductors from the channel gate circuit 72 so that each code pulse is applied to the corresponding trigger circuit, or alternatively, the distribution of the output voltages of the trigger circuits should be arranged accordingly.

The arrangements described in Fig. 4 can be modified for a simple addition code with any number of units. Thus for an $m$-unit code, there will be $m$ trigger devices similar to 48, and the output voltage should be adjusted to values proportional respectively to $2(m-r)$ where $r$ takes all integral values from 1 to $m$.

What is claimed is:

1. An electric pulse code modulator employing a simple addition binary code of $m$ units where $m$ represents a given integer, comprising a sequence of $m$ two-condition trigger devices each adapted to produce a given positive output potential difference when in the first condition and an equal negative output potential difference when in the second condition, and each adapted to be switched to the first and second conditions respectively on application thereto of negative and positive input potential differences, means for applying a signal potential difference to switch the first trigger device according to the sign of the signal potential difference, means for applying to each of the remaining trigger devices a potential difference determined by the algebraic sum of the said signal potential difference and of the output potential differences of all the preceding trigger devices in the sequence and means for deriving from each trigger device a code potential having one of two fixed values corresponding respectively to the said first and second conditions, the value of the said given output potential difference for the $r$th trigger device of the sequence being proportional to $2(m-r-1)$ where $r$ represents one of the integral values 1 to $m-1$ (inclusive).

2. An electric pulse code demodulator for code groups of pulses representing instantaneous signal amplitudes according to a simple additional binary code of $m$ units where $m$ represents a given integer, comprising a series of $m$ two condition trigger devices each adapted to produce a given output voltage when switched from the first condition to the second condition, means for applying the pulses which represent the code elements respectively to switch the trigger devices corresponding to the said code elements over to the second condition, means for combining the output voltages of the trigger devices, and means for recovering the modulating signal wave from the combined output voltages, the given output voltages for the said trigger circuits being respectively adjusted to values proportional to $2^{(m-r)}$, where $r$ represents one of the integral values from 1 to $m$ (inclusive).

3. A modulator according to claim 1 in which each trigger device comprises two thermionic valves, the anode of each of which is connected through a resistance to the control grid of the other in such a manner as to form a double-stable multivibrator.

4. A modulator according to claim 3 in which the anodes of the two valves of each multivibrator are respectively connected through resistances to the control grids of the corresponding valves of the next multivibrator in the series.

5. A modulator according to claim 3 in which the signal potential difference is applied through resistances between the control grids of the valves of the first multivibrator of the series.

6. A modulator according to claim 3, comprising means for deriving the code potential from the anode of one of the valves of each multivibrator.

7. A modulator according to claim 1, comprising means for gating the code potentials derived from each multivibrator in such a manner as to produce a code pulse only when the code potential has a given one of the said two fixed values.

8. A modulator according to claim 7 comprising means for time distributing the code pulses in such manner that they are transmitted in a specified order.

9. A demodulator according to claim 2 in which each trigger device comprises two thermionic valves of the anode of each of which is connected through a resistance to the control grid of the other in such manner as to form a double stable multivibrator.

10. A demodulator according to claim 2 comprising means for gating the combined output voltage of the trigger devices in order to produce an output pulse of amplitude corresponding to the instantaneous modulating signal amplitude and means for passing the output pulses corresponding to successive code groups of pulses through a low pass filter for recovering the modulating signal.

11. A demodulator according to claim 10 comprising means for restoring all trigger devices to the first condition after producing the said output pulse.

CHARLES WILLIAM EARP.
MALCOLM FRANK WINTLE.

REFERENCES CITED

The following references are of record in the file of this patent:

UNITED STATES PATENTS

| Number | Name | Date |
|---|---|---|
| 2,272,070 | Reeves | Feb. 3, 1942 |

OTHER REFERENCES

Article—"Pulse Code Modulation" published in the Transactions of the I. I. E. E., vol. 66, pages 895–899 for April 1947 by H. S. Black and J. O. Edson.